United States Patent [19]

Takahashi

[11] Patent Number: 5,383,033
[45] Date of Patent: Jan. 17, 1995

[54] IMAGE PROCESSOR FOR AN IMPROVED TONE LEVEL EXPRESSION

[75] Inventor: Yasuhiko Takahashi, Tokyo, Japan

[73] Assignee: Nippon Steel Corporation, Tokyo, Japan

[21] Appl. No.: 965,791

[22] Filed: Oct. 23, 1992

[30] Foreign Application Priority Data

Oct. 25, 1991 [JP] Japan .................. 3-306694

[51] Int. Cl.⁶ .............................................. H04N 1/40
[52] U.S. Cl. ...................................... 358/456; 358/457
[58] Field of Search ................ 358/429, 465, 455–459; 382/50–53

[56] References Cited

U.S. PATENT DOCUMENTS

| | | | |
|---|---|---|---|
| 4,701,806 | 10/1987 | Takashima | 358/457 |
| 5,081,691 | 1/1992 | Chesley | 382/51 |
| 5,134,666 | 7/1992 | Imao et al. | 382/50 |

FOREIGN PATENT DOCUMENTS 231562  1/1990  Japan .

OTHER PUBLICATIONS

J. C. Stoffel et. A Survey of Electronic Techniques for Pictorial Image Reproduction IEEE Transactions on Communications vol. Com–29, No. 12, Dec. 1981.

*Primary Examiner*—Stephen Brinich
*Attorney, Agent, or Firm*—Pollock, Vande Sande & Priddy

[57] ABSTRACT

An image processor comprises means for determining generation of a dot by a dither method when an inputted data is a low gray level region not larger than a first threshold, means for generating a dot and distributing an error in a peripheral area when the inputted data is in a high gray level region larger than a second threshold, and means for generating a dot and distributing an error in a peripheral area when the inputted data is in a region higher than an intermediate gray level region larger than the first threshold and not larger than the second threshold, and for generating no dot and distributing an error the portion by which the inputted data exceeds the first threshold in a peripheral area as error, so that different tone level processing is performed in accordance with the gray level of the inputted data.

13 Claims, 3 Drawing Sheets

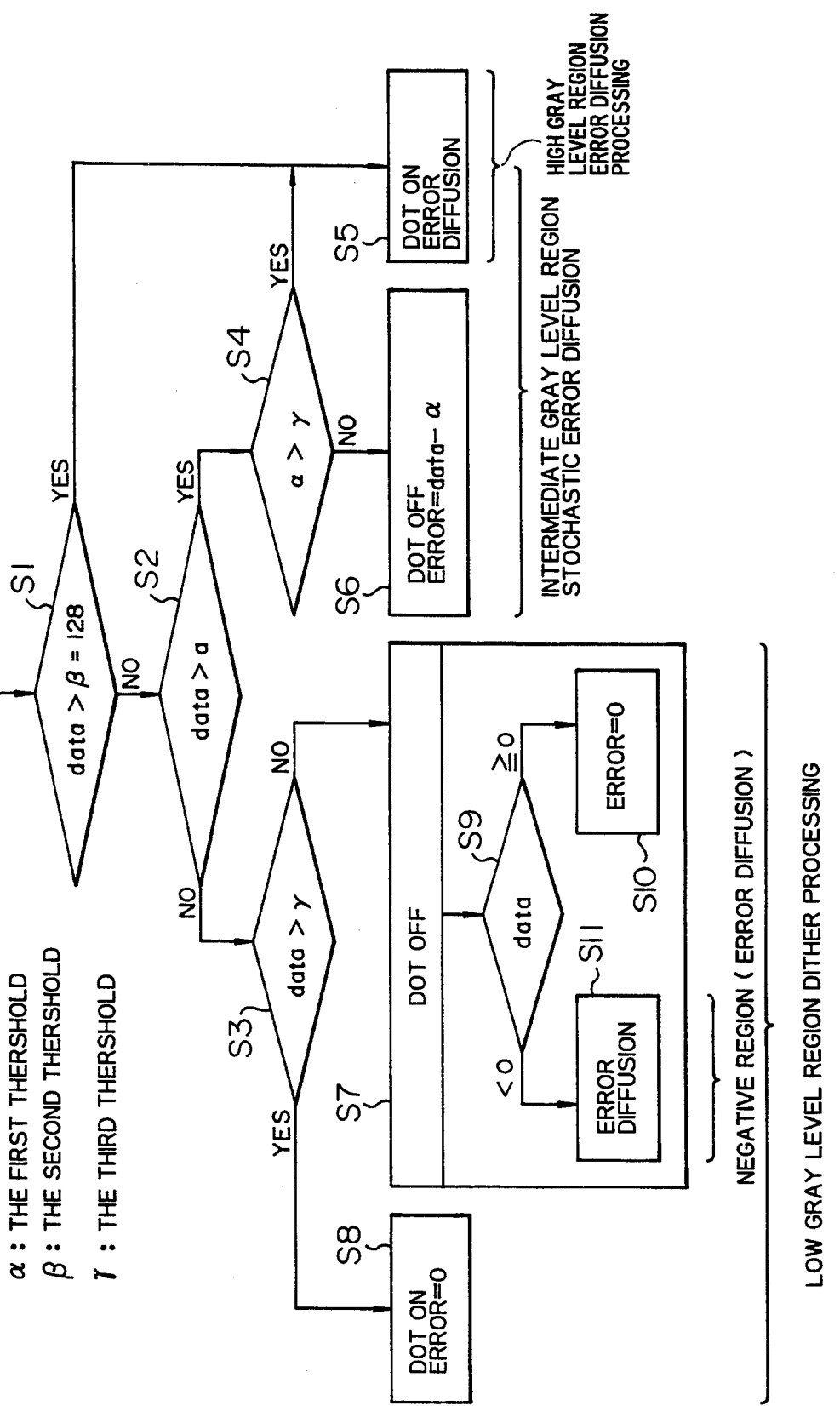

IMAGE PROCESSOR FOR AN IMPROVED TONE LEVEL EXPRESSION

BACKGROUND OF THE INVENTION

1. Field of the Invention

The present invention relates to an image processor, and more particularly to an image processor in which half-toning is performed when image data of continuous-tone are inputted so that an image attended with assigning tone levels may be printed and recorded.

2. Description of the Related Art

A dither method, a gray level pattern method and the like have been heretofore known as techniques for performing intermediate tone expression. These techniques have such a problem that a moire is generated in a reproduced image in case the image is a mesh point image. Further disadvantage is that when the image includes a line, character and the like, an edge of the line or character becomes broken into pieces.

Thus, an error diffusion method is used sometimes as a technique for solving those problems. In the error diffusion method, however, there is also such a problem that when a highlighted portion is processed, recorded dots are concentrated at undesired areas and fiber-like noises appear conspicuously. In order to solve these problems, it is proposed to use an image processor having means for selectively using one of the dither method and the error diffusion method depending on the gray level of the input data, as disclosed in JP-A-2-31562.

In a conventional image processor, however, the dither method and the error diffusion method are simply changed from one to the other. Therefore, in case of an image having a gradation of the tone level, which changes continuously, the image quality of the printed image changes at a position where the dither method and the error diffusion method are changed over, resulting in an ugly appearance.

SUMMARY OF THE INVENTION

It is an object of the present invention to solve the above problems and to provide an image processor which is capable of preventing generation of visually unpleasant noise.

It is also an object to provide an image processor which is able to present smooth tone level variation by maintaining continuity of a printed image at a position where the dither method and the error diffusion method are changed from one to the other.

In order to attain the above-described object, an image processor of the present invention is provided with means for comparing a fixed value with a predetermined value, and changing over a plurality of dot generating means according to the result of such comparison when multi-tone level image data inputted from the outside are within a predetermined gray level range.

Furthermore, in order to attain other objects, the image processor of the present invention performs selectively one of different tone-level processings depending on which of the following three regions the tone level of the input data belongs to. Namely, first, ① there is provided means for determining generation of a dot by the dither method when the input image data indicates a tone level in a low gray level region which is not larger than a first threshold. Further, ② there is provided means for generating a dot and also distributing errors in peripheral areas when the input image data indicates a tone level in a high gray level region larger than a second threshold which is larger than the first threshold. Furthermore, ③ there is provided means for comparing the first threshold with a third threshold value which is generated by a predetermined process when the input image data indicates a tone level in an intermediate gray level region larger than the first threshold but not larger than the second threshold, and generating a dot and distributing errors in the peripheral areas when the third threshold value is higher than the first threshold, and generating no dot and distributing a part of the image data exceeding the first threshold in the peripheral areas as errors when the third threshold value is in the low gray level region.

In this case, the third threshold value is generated either at random in a range from a zero tone level to the highest tone level or in accordance with a dither matrix.

Further, in case the input image data indicates a tone level in a low gray level region which is not larger than the first threshold, it is desirable that generation of a dot is determined based on the comparison of the data with the threshold according to the dither method, and that errors are distributed in peripheral areas when the image data corrected by errors distributed from the peripheral areas is negative.

Furthermore, it is advisable that the threshold according to the dither method is determined in the same manner as that of the third threshold value.

BRIEF DESCRIPTION OF THE DRAWINGS

FIG. 2 is a flow chart for explaining a processing procedure of the embodiment;

DESCRIPTION OF THE PREFERRED EMBODIMENTS

An embodiment of an image processor of the present invention will be described with reference to the accompanying drawings.

Figure 1:
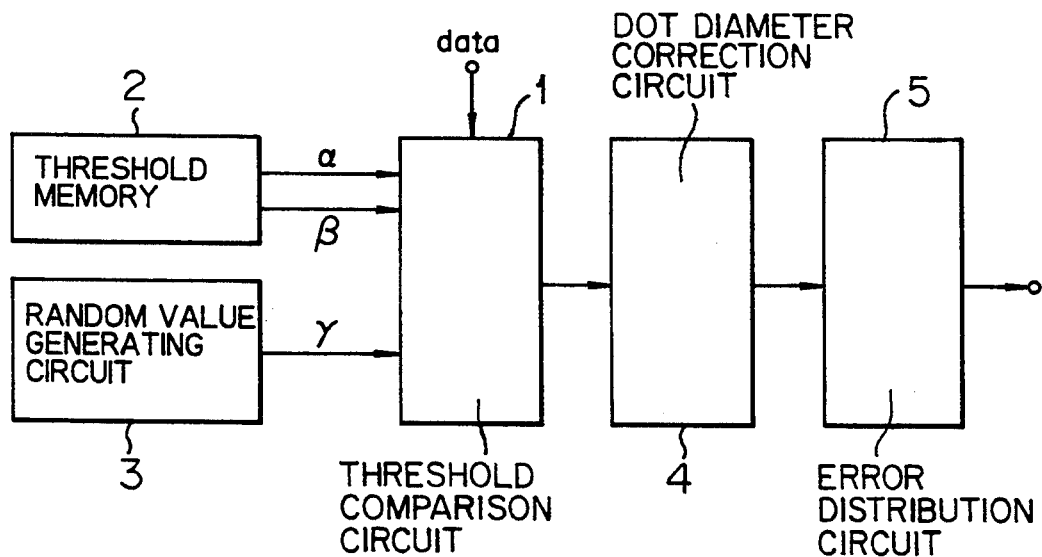
FIG. 1 is a block diagram showing an image processor according to an embodiment of the present invention.

FIG. 1 is a block diagram showing an image processor according to an embodiment of the present invention, and FIG. 2 is a flow chart for explaining the flow of processing in the image processor shown in FIG. 1.

Figure 4:
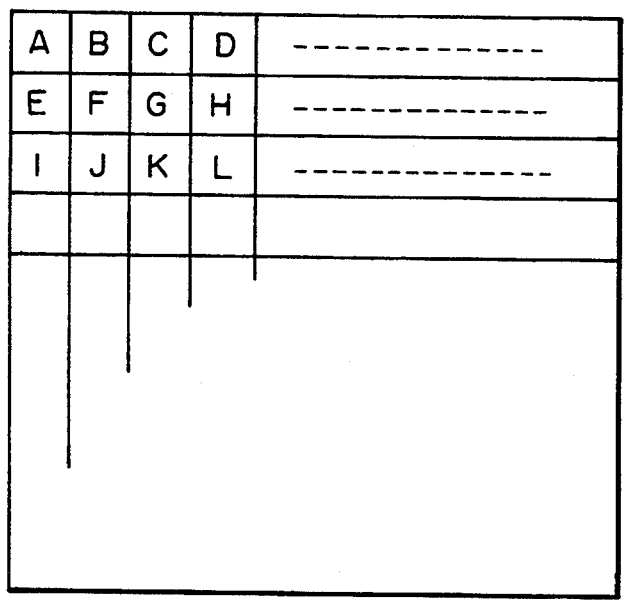
FIG. 4 shows a matrix of pixels constituting an image to be processed.

As shown in FIG. 1, an image processor of the present embodiment includes a threshold comparison circuit 1, a threshold memory 2, a random value generating circuit 3, a dot diameter correction circuit 4, and an error distribution circuit 5. The image to be processed is represented by a plurality of pixels A, B, C, ... E, F, G, ... I, J, K ... as shown in FIG. 4. The tone data indicating the tones of the respective pixels are sequentially processed in an order from the pixels of the uppermost row to those of the lower-most row and from the leftmost pixel to the right-most pixel in each row, that is, in an order of A B C ... E F G ... I J K ... in FIG. 4.

Figure 3:
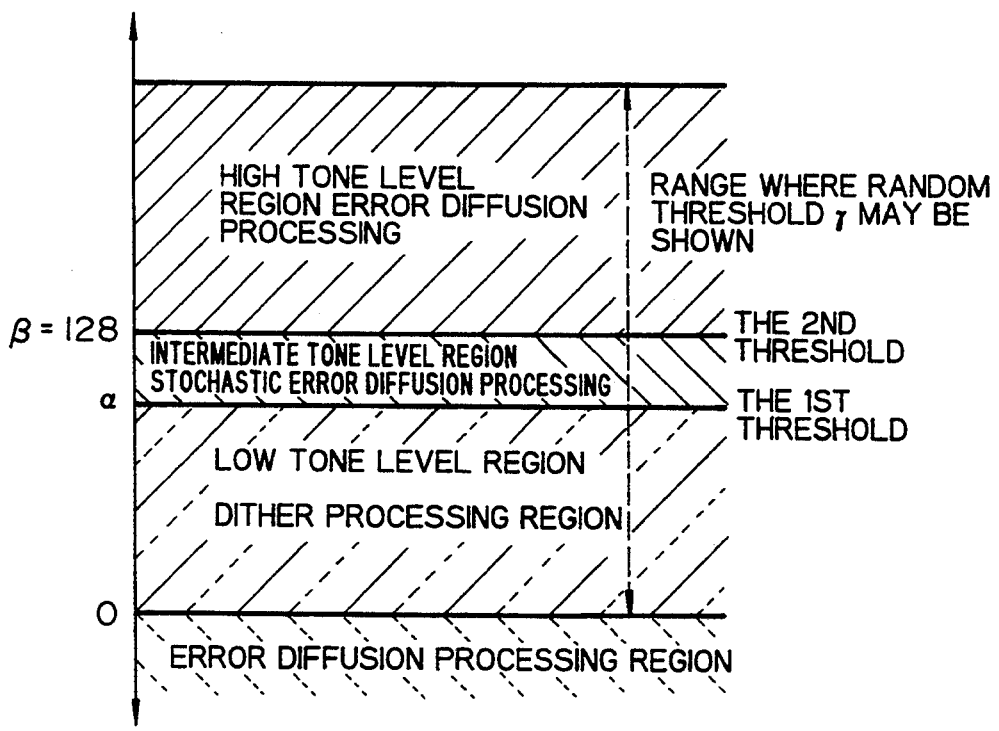
FIG. 3 is an explanatory diagram for explaining three regions of the tone level in the embodiment.

The continuous-tone data "data" are inputted to the threshold comparison circuit 1. The threshold comparison circuit 1 compares the inputted multi-tone level data "data" with the threshold stored in the threshold memory 2. A first threshold $\alpha$ and a second threshold $\beta$ ($\alpha < \beta$) as shown in FIG. 3 are stored in the threshold memory 2. It is assumed that in an image processor of this embodiment, the tone of an image is represented by one of 256 levels from 0 to 255.

The dot diameter correction circuit 4 corrects an influence by an overlap portion of the dots, and the error distribution circuit 5 distributes errors at predetermined proportions in four directions, that is, right, left downward, downward and right downward directions. For example, when a pixel F, as shown in FIG. 4, is processed, the error is distributed to the pixels G, I, J and K at fixed proportions such as 30%, 20%, 30% and 20%, respectively, In the image processor of the present embodiment thus structured, the second threshold $\beta$ is set at a value 128 which is a half of 256 tone levels. Further, when the value of the input data "data" exceeds the second threshold $\beta=128$, that is, when the value falls within the high tone level region shown in FIG. 3, the tone level processing is executed by error diffusion. That is, a dot is generated when the value of the input data exceeds the second threshold $\beta=128$. Then, when the dot is generated, the difference (255-data) between the tone level value=255, which is the tone level of an actual printed dot, and the inputted data "data" is distributed, as an error, in peripheral areas.

The value of the inputted data "data" after being corrected by the errors as distributed from peripheral areas may show a negative value depending on the quantity of the errors diffused from the peripheral areas, but error diffusion processing is executed also on an area where the corrected tone data is negative as shown in FIG. 3. In this case, the dot is not generated, but the error as received is distributed to a further next dot.

In case of a low tone level region where the value of the inputted data "data" is not larger than the first threshold $\alpha$, it is determined by dither processing whether the dot is to be generated or not. Further, in the intermediate tone level region where the value of the inputted data "data" falls between the first threshold $\alpha$ and the second threshold $\beta$, whether the dot is to be generated or not is determined based on a third threshold value supplied from the random value generating circuit 3, that is, a random value $\gamma$. In the present embodiment, whether the dot is to be generated or not is determined by a random dither system in the dither processings in case of the input data having a tone level in a low tone level region.

The random value $\gamma$ supplied from the random value generating circuit 3 is obtained by generating a numeric value from 0 to 255 at random, and generation of the dot is determined depending on whether the data in the low tone level region exceeds the random threshold $\gamma$ or not. These means include means for determining generation of the dot by the dither method when the continuous-tone data supplied from the outside is in the low gray level region not larger than the first threshold, means for generating the dot and also distributing errors in peripheral areas in case of the input data being in the high gray level region larger than the second threshold $\beta$, means for comparing the random value $\gamma$ with the first threshold $\alpha$ when the inputted image data "data" falls within the intermediate gray level region larger than the first threshold $\alpha$ and not larger than the second threshold $\beta$, and generating the dot and distributing the errors in the peripheral areas when the random value $\gamma$ is less than the first threshold $\alpha$, and generating no dot and distributing a part of the dot exceeding the first threshold as an error in the peripheral areas when the random value $\gamma$ is no less than the first threshold $\alpha$. The above respective means may be constituted by a program of a CPU (not illustrated) provided in the threshold comparison circuit 1 for instance.

Next, the operation of the image processor in the present embodiment will be described in detail with reference to the flow chart shown in FIG. 2.

First, when the operation is started, it is determined in step S1 whether the value of the inputted data "data" exceeds the second threshold $\beta=128$ or not. When it is determined that the value of the inputted data "data" exceeds the second threshold $\beta=128$, it is judged that the inputted data "data" is in the high tone level region, so that the dot is generated and the error is diffused as described previously.

When it is determined in step S1 that the value of the inputted data "data" does not exceed the second threshold $\beta=128$, the processing proceeds to step S2, and the value of the inputted data "data" is compared with the first threshold $\alpha$. When the comparison indicates that the value of the inputted data "data" is not larger than the first threshold $\alpha$, it is decided that the data is in the low tone level region shown in FIG. 3, and random dither processing is performed.

Incidentally, in the error diffusion method performed on the data of the high tone level region, the threshold with which the input data is compared is fixed as above-mentioned. On the other hand, in the dither error diffusion method, the threshold is determined by using a dither matrix and hence the threshold is variable depending on the position of the pixel on the image to be processed. Especially, in the normal dither method, the matrix of the threshold values is fixed, while in the random dither method, the matrix of the threshold values is produced randomly. The error diffusion method of various types as mentioned above are well known as disclosed, for example, in J. C. Stoffel, et al, "A survey of Electronic Techniques for Pictorial Image Reproduction" IEEE Transactions on Communications, Vol. COM-29, No. 12, December 1981, pp 1898-1925.

In this case, first, a third threshold or random value $\gamma$ generated at random is compared with the value of the inputted data "data" in step S3. When the value of the inputted data "data" is larger than the random value $\gamma$, the dot is generated and the error is made zero in step S8. Here, the random value $\gamma$ from the random value generating circuit is used, but other random value may also be used.

On the other hand, when the value of the inputted data "data" is not larger than the random value $\gamma$, no dot is generated in step S7, but whether the error is to be diffused or not is determined depending on whether the inputted data "data" is negative or not in step S9.

In this case, when the inputted data "data" is negative, it is determined that the data is in the negative error diffusion region shown in FIG. 3. Then, a dot is generated and the error is diffused in step S11. On the other hand, when the inputted data "data" is positive, the error is made zero in step S10.

Further, when it is determined in step S2 that the inputted data "data" is in the intermediate tone level region shown in FIG. 3, a composite processing of the error diffusion and the dither processing is performed. Besides, in the present embodiment, the composite processing is referred to as stochastic error diffusion processing. In this stochastic error diffusion processing, the random value $\gamma$ and the first threshold $\alpha$ are compared with each other in step S4, and error diffusion processing is performed in step S5 when the first threshold $\alpha$ is larger than the random value γ. Namely, this case is the same as the case where the high tone level region is lowered to the level of the inputted data "data".

On the other hand, when it is determined in step S4 that the first threshold α is not larger than the random value γ, the processing proceeds to step S6, and the error is distributed without generating the dot. In this case, the distributed error is obtained by subtracting the first threshold α from the inputted data "data". That is, a part of the error due to generation of no dot exceeding the first threshold α is distributed in the peripheral areas and another part below the first threshold α is absorbed through the dither processing.

A sharp change in the image quality will not appear even in an image having a gradation of tone levels processed in this manner.

Although, an embodiment using random dither has been described above, the same effects can be obtained when a dither matrix is prepared beforehand, the threshold value γ' is read out of the dither matrix so that the threshold γ' is variable depending on the dot position, and the comparison is made in the step S3 with the threshold γ' in place of the value Y.

According to the present invention, it is possible to provide an image processor capable of preventing generation of visually unpleasant noises. Further, according to the present invention, a dither method is used when the inputted image data is in the low gray level region, an error diffusion method is used when the data is in the high gray level region, and a stochastic processing in which the error diffusion method and the dither method are combined is performed when the data is in the intermediate gray level region as described above. Thus, it is possible to prevent the image quality from changing suddenly even in an image having gradation. With this, it is possible to provide an image processor for presenting tone level expression with no fiber-like noise while maintaining the continuity of the image.

I claim:

1. An image processor for presenting tone level expression on the basis of continuous-tone image data applied thereto, said processor comprising:
   a plurality of dot generating means for generating a dot on the basis of the image data in different modes, respectively, to be used when a tone represented by the image data is in a gray level region between a high level region and a low level region; and
   means for comparing a fixed first value with a second value generated in a predetermined way, when the tone represented by said image data is in the gray level region; and
   selecting one of said plurality of dot generating means depending on a result of the comparison.

2. An image processor according to claim 1, wherein said second value is generated at random in a range from a zero tone level to a highest tone level.

3. An image processor according to claim 1, wherein said second value is generated in accordance with a dither matrix.

4. An image processor for presenting tone level expression on the basis of continuous-tone image data applied thereto, said processor, comprising:
   means for determining generation of a dot by a dither method when said image data is in a low gray level region not larger then a first threshold;
   means for generating a dot and distributing an error in a peripheral area when said image data is in a high gray level region larger than a second threshold, which is larger than said first threshold; and
   means for comparing said first threshold with a third threshold, which is produced by a predetermined process, when said image data is in an intermediate gray level region larger than said first threshold and not larger than said second threshold, generating a dot and distributing an error in a peripheral area when said first threshold is larger than said third threshold, and generating no dot and distributing a portion of the error exceeding said first threshold in peripheral areas as an error when said first threshold is not larger than said third threshold.

5. An image processor according to claim 4, wherein said third threshold is generated at random in a range from a zero tone level to a highest tone level.

6. An image processor according to claim 4, wherein said third threshold is generated in accordance with a dither matrix.

7. An image processor according to claim 4, wherein, when said image data is in the low gray level region, generation of the dot is determined through comparison with a threshold of a dither method, and the error is distributed in the periphery area when said image data including an error distributed from a periphery is negative.

8. An image processor according to claim 7, wherein said threshold of the dither method is determined by the same process as said third threshold.

9. An image processor for presenting tone level expression on the basis of continuous-tone image data applied thereto, said processor, comprising:
   means for determining generation of a dot by a dither method when said image data is in a low gray level region not larger than a first threshold;
   means for generating a dot and distributing an error in a peripheral area when said image data is in a high gray level region larger than a second threshold, which is larger than said first threshold; and
   means for comparing said first threshold with a third threshold which is generated by a predetermined process when said image data is in an intermediate gray level region larger than said first threshold and not larger than said second threshold, and generating a dot and distributing an error in a peripheral area when said third threshold is in a region higher than said intermediate gray level region, and for generating no dot and distributing an error portion by which said image data exceeds said first threshold when said third threshold is in said low gray level region.

10. An image processor according to claim 9, wherein said third threshold is generated at random in a range from a zero tone level to a highest tone level.

11. An image processor according to claim 9, wherein said third threshold is generated in accordance with a dither matrix.

12. An image processor according to claim 9, wherein, when said image data is in the low gray level region, generation of the dot is determined through comparison with a threshold of a dither method, and the error is distributed in the periphery area when said image data including an error distributed from a periphery is negative.

13. An image processor according to claim 12, wherein said threshold of the dither method is determined by the same process as said third threshold.

* * * * *